F. GUASCH.
TRACTION SHOE FOR VEHICLE WHEELS.
APPLICATION FILED AUG. 21, 1920.
1,377,679.  Patented May 10, 1921.
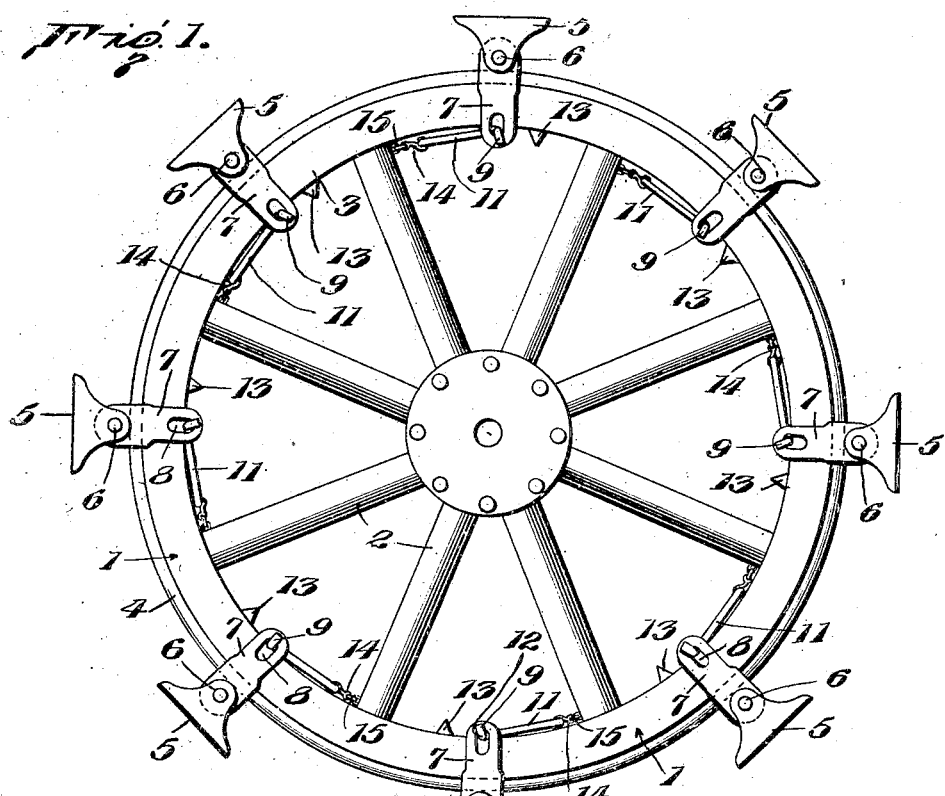
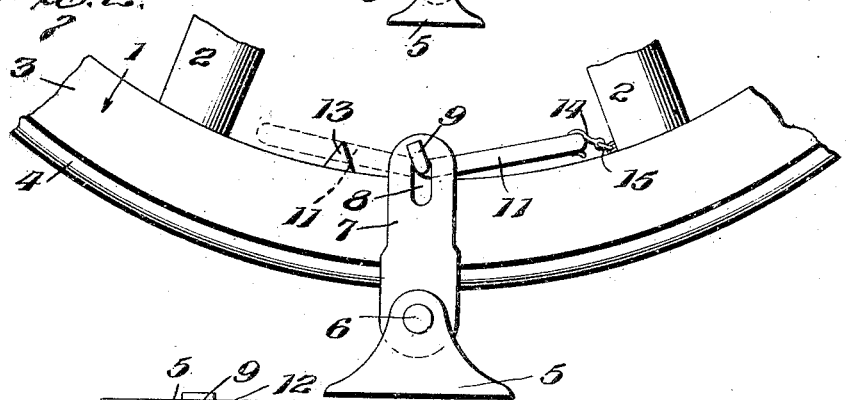
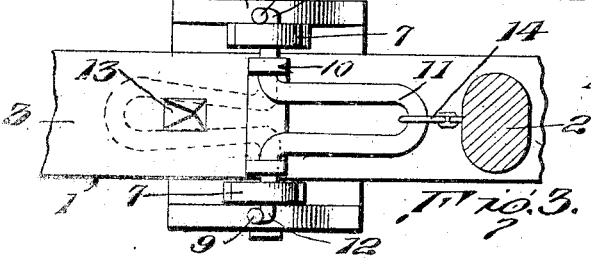
Inventor
Fidelio Guasch,
by Lawrence Langner
Attorney

UNITED STATES PATENT OFFICE.

FIDELIO GUASCH, OF SAN NICOLAS, CUBA.

TRACTION-SHOE FOR VEHICLE-WHEELS.

1,377,679.    Specification of Letters Patent.    Patented May 10, 1921.

Application filed August 21, 1920. Serial No. 405,193.

*To all whom it may concern:*

Be it known that I, FIDELIO GUASCH, a citizen of the Republic of Cuba, and resident of San Nicolas, Cuba, have invented certain new and useful Improvements in Traction-Shoes for Vehicle-Wheels, of which the following is a specification.

This invention relates to traction shoes for vehicle wheels; and it resides in the provision of an improved device of the character indicated which is so constructed as to admit of its being readily applied to the rim of a vehicle wheel,—more particularly to the wheel of an automobile or motor truck—to afford the necessary traction and non-skidding action when the vehicle is about to travel over a stretch of soft, muddy or rough road, and of being removed with equal facility when a stretch of hard, smooth or paved road is encountered.

According to the invention, a set of stirrup-shaped blocks or shoes is employed which straddle the rim of the wheel at equidistant intervals and which are linked to specially-constructed rock shafts; the latter being journaled in bearings provided on the inner face of the rim and locked in a position in which the disengagement of their ends from the connecting links is prevented, with the result that the shoes are held in operative relation to the wheel and their accidental displacement completely precluded. On the other hand, when it becomes necessary to demount the shoes, it is sufficient merely to unlock the rock shafts and swing them into the other of their two positions, whereupon their ends can be readily withdrawn from engagement with the connecting links, which latter, with the shoes, may then be removed from the wheel.

An embodiment of the invention is illustrated in the accompanying drawing, in which:—

Figure 1 is a side elevation of a wheel equipped with the improved traction shoes;

Fig. 2 is a detail view, on an enlarged scale, showing one of the shoes in operative position on the wheel; and Fig. 3 is a plan view of Fig. 2.

Referring more particularly to the drawing, 1 indicates in a general manner a conventional vehicle wheel, such as a truck or tractor wheel; 2 the spokes thereof; 3 the rim and 4 the flat metal tire, though it is to be understood that wheels of various other types, fitted with tires of different kinds, may be substituted for the one represented, without departing in any way from the invention.

The improved shoes 5 are arranged around the wheel at equal distances apart, preferably midway between the spokes, and are constructed in the form of stirrup-shaped, or U-shaped blocks or elements of suitable wear-resisting material. The side members of the shoes are substantially triangular, and are perforated adjacent their apices for the reception of the ends of cross-pins or pivots 6 which may be retained therein in some way and which also pass through the perforated outer ends of pairs of connecting links 7; said link ends being disposed inwardly of the shoe sides, as shown. There is a pair of these connecting links for each shoe, as will be understood, the links extending radially across the rim 3 and having their inner ends provided with longitudinal slots 8. Hence the arrangement is such that the shoes and their connecting links virtually straddle the wheel rim and, by reason of that fact, may be easily and quickly placed on and removed from the wheel.

The attachment of the shoe units—that is to say, the shoes proper and their links—to the wheel, is preferably effected by means of the rock shafts 9, which, as represented in Fig. 3, extend transversely across the inner face of the rim 3 midway between the spokes and have their ends passed through the slots 8 in the links; each rock shaft being journaled adjacent its ends in perforations formed through the vertical legs of a U-shaped bearing plate 10 fixed to said rim face. These rock shafts are constructed of spring metal, and the central portion of each is formed with a transversely-extending, U-shaped neck 11, whose sides tend to move toward each other, due to the springiness of the metal, as indicated in dotted lines in Fig. 3, so that the necks may, therefore, be regarded as contracted when in free or inactive position. The terminals of the rock shafts are bent abruptly sidewise, as indicated at 12, and are somewhat shorter than the link slots 8, so that in one position of the shafts, their terminals can be passed through said slots to couple the links to the shafts; and thereafter, when the shafts are rocked into operative position, their terminals will be moved out of alinement with the slots and will, in consequence, lock the shoe units to the rim while still permitting them to have a slight swinging or rocking movement in one direction or the other, according to the direction of rotation of the wheel.

It has already been stated that the U-shaped neck 11 of each of the spring rock shafts tends to assume a contracted position, in consequence of which fact the shaft terminals 12 will likewise be caused to move toward each other. This will have the effect of disposing said terminals too close together to permit their introduction through the link slots 8, and, hence the employment of some means for spreading the neck members apart becomes necessary. Accordingly, there is provided on the wheel rim to the left of and between each pair of bearings 10, an expanding device or wedge 13, here shown as having a pyramidal shape, which is adapted to enter the space between the neck members and force them away from each other, thereby bringing the terminals 12 into a position in which they can be inserted through the link slots. Thereafter, when the shaft is swung back to the right, to its normal or active position, the terminals will move out of registration with the slots and the neck will be maintained in its expanded condition.

Means are preferably provided to lock the rock shafts in operative position, so as to prevent them from accidentally swinging back to the left and disengaging the links; such means being here shown as comprising a hook 14 for each shaft which is attached to the adjacent spoke 2 by a small chain 15 or the like and is adapted to engage the neck end, as indicated in Figs. 2 and 3. These hooks may also be employed to hold the shafts against swinging movement during the time when the shoe units are not in use.

Assuming that the shoes are to be applied to the wheel and that the necks of the rock shafts occupy the full line position shown in Figs. 2 and 3 and are held in such position by the hooks or latches 14, the operation is as follows: The shoe units are first positioned one at a time to straddle the wheel rim, and after a unit has been so positioned, the hook 14 of the corresponding rock shaft is unlatched and the rock shaft is swung toward the left so as to cause the sides of its neck to be engaged and forced apart by the wedge 13, such expanding action either introducing the terminals 12 through the link slots 8, or else bringing them to a position in which their passage through said slots can be readily effected. The rock shaft is thereafter swung back again to the right and reëngaged with hook 14, the same operations being repeated for the rest of the shoe units.

I claim as my invention:

1. A traction-attachment for vehicle wheels, comprising a shoe unit adapted to straddle the wheel rim and having its sides slotted adjacent their inner ends, and a rock shaft journaled transversely of said rim and having laterally-offset terminals for introduction through the slots in the shoe sides to fasten the shoe to said shaft; the shaft being rockable from a position in which its terminals register with said slots to one in which they are out of register therewith.

2. A traction-attachment for vehicle wheels, comprising a shoe unit adapted to straddle the wheel rim and having its sides slotted adjacent their inner ends, a spring metal fastening member mounted transversely of said rim for rocking movement in opposite directions and having offset terminals for introduction through the slots in the shoe sides to fasten the shoe to said member; the said member being formed with a central, normally-contracted neck which holds said terminals away from said slots, and an expanding device on the wheel rim to engage the sides of said neck and force them away from each other when the fastening member is rocked in one direction, so as to move said terminals into position to be passed through said slots.

In testimony whereof I affix my signature.

FIDELIO GUASCH.